Patented June 17, 1930

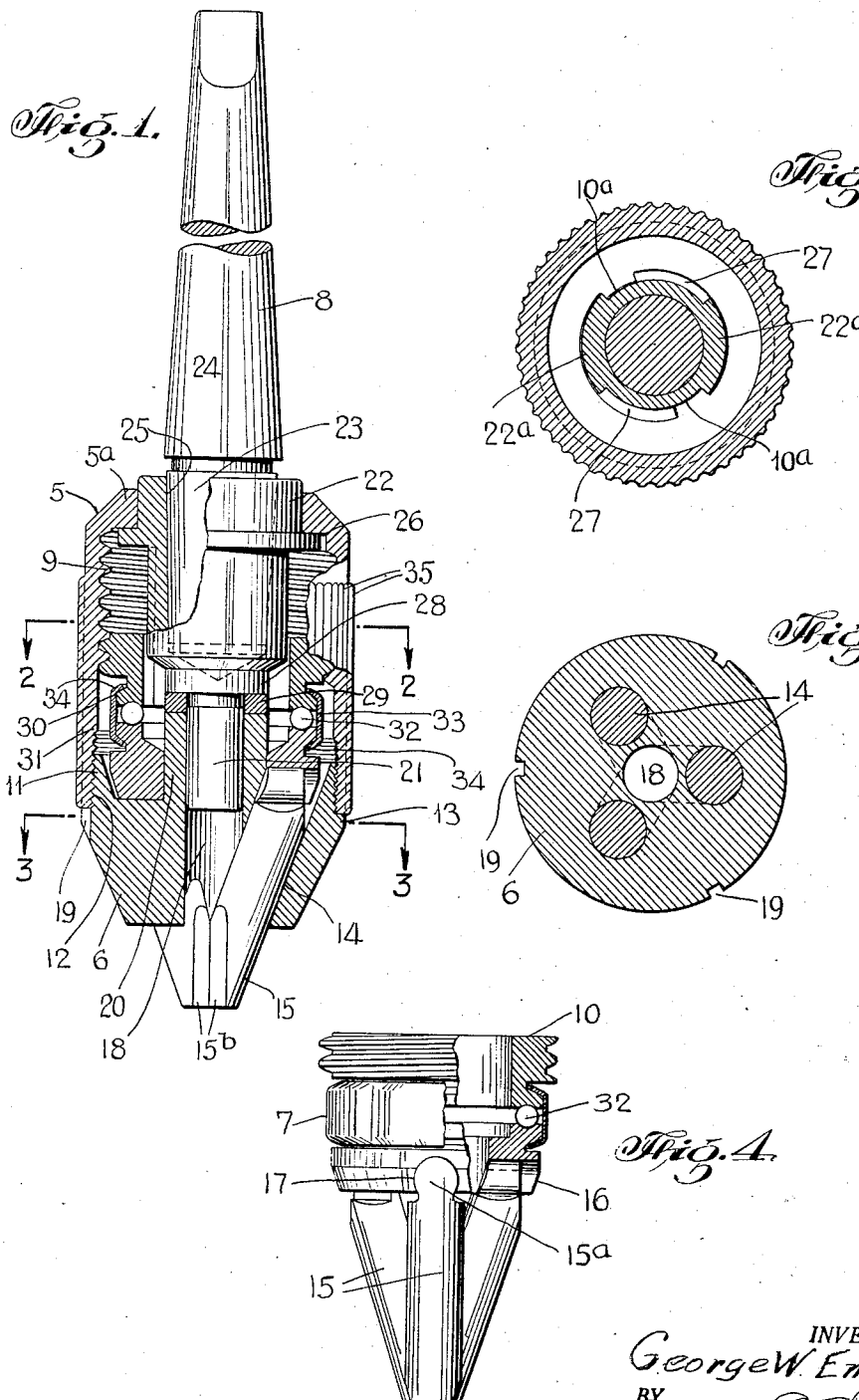

1,764,290

UNITED STATES PATENT OFFICE

GEORGE W. EMRICK, OF BROOKLYN, NEW YORK, ASSIGNOR, BY MESNE ASSIGNMENTS, TO ETTCO TOOL CO. INC., OF BROOKLYN, NEW YORK, A CORPORATION OF NEW YORK

CHUCK DEVICE

Application filed October 12, 1928. Serial No. 311,995.

This invention relates to chuck devices and particularly to a jaw supporting and operating unit for devices of this class; and the object of the invention is to provide a jaw supporting and operating unit in connection with which the jaws of the chuck are movably supported and whereby said unit may be attached to and removed from the body of a chuck as a unit; a further object being to provide a jaw supporting and operating unit consisting of two annular bodies, one termed a ring and the other a collar with means involving a series of balls and a coupling member for said ring and collar to form thereof a ball bearing construction permitting independent rotary movement of one body with respect to the other, one of said bodies, namely the ring, having a series of radial apertures for movably supporting the edges therein and the other or collar having means for engaging part of the chuck body to permit movement of the unit longitudinally with reference to the axis of said body; and with these and other objects in view, the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a sectional view of a chuck body showing one of my improved jaw supporting and operating units mounted in connection therewith.

Fig. 2 is a section on the line 2—2 of Fig. 1.

Fig. 3 is a section on the line 3—3 of Fig. 1; and,

Fig. 4 is a side and sectional view of one of my improved units detached.

In the accompanying drawing, I have shown for the purpose of illustrating one use of my invention, a chuck device which constitutes the subject matter of a prior application filed by me on September 18, 1928, and bearing Serial No. 306,752, and while this chuck is shown to illustrate a use of my invention, it will be understood that my improved unit may be employed in connection with chuck devices of other design and construction, the only essential feature being that the chuck device must be provided with means cooperating with the collar of the unit to permit the movement of the unit longitudinally with respect to the axis of the chuck.

In the accompanying drawing, the chuck device consists of two casing parts 5 and 6. At 7, Fig. 4 of the drawing, I have shown one of my improved jaw supporting and operating units, and at 8 is shown a spindle unit employed in connection with the device. The casing 5 is provided at one end thereof with an internal screw thread 9 in connection with which a screw threaded collar 10 of the unit 7 operates to feed said unit upwardly and downwardly in the casing 5. The other end of the casing is internally threaded as seen at 11 to receive corresponding threads 12 on the part 6, the latter part having a shoulder 13 which abuts the lower wall of the casing 5.

The projecting portion of the part 6 is conical in form and is provided with three angular bores 14 which are equally spaced circumferentially of said part and are adapted to receive and guide three jaw members 15 on the unit 7 in their movement inwardly and outwardly as well as radially in the chuck device. The jaws 15 are supported in connection with a mounting ring 16 on the unit 7 and this ring has three substantially circular sockets 17 in which cylindrical heads 15$^a$ of the jaws 15 are slidably mounted, permitting radial movement of the jaws with respect to said ring. The inner adjacent faces of the jaws 15 at the lower ends thereof are provided with angularly and perpendicularly arranged jaw faces 15$^b$ adapted to engage a drill or other tool mounted in the central bore 18 of the part 6.

The part 6 has a plurality of notches 19 to receive a spanner or other wrench, facilitating the coupling and uncoupling of the parts 5 and 6. The part 6 has an upwardly directed tubular extension 20 which forms an axis for the jaw mounting ring 16 and also a bearing for a protruding trunnion 21 constituting part of the spindle unit 8 or an adaptor 22 mounted on the tapered end 23 of the spindle proper 24. The tapered end 23 of the spindle seats in a tapered bore 25 in the adaptor 22 to firmly couple said parts. The adaptor 22 is rotatably mounted in a bearing portion 5ª at the upper end of the part 5 having a retaining flange 26 cooperating with said bearing portion preventing displacement of the unit 8. The shank portion of the adaptor 22 is provided with oppositely arranged and radially projecting clutch faces 22ª adapted to cooperate with inwardly projecting clutch members 10ª on the part 10 of the unit 7.

The circumferential dimensions of the members 22ª and 10ª are such as to leave comparatively long clearance spaces, designated at 27 note Fig. 2 of the drawing, between said members permitting free rotary movement of the casing of the chuck with respect to the spindle unit thus permitting one clutch member to strike the other in hammer blow fashion especially in the operation of releasing a tool.

The adaptor 22 is provided with a shoulder 28 at the upper end of the trunnion 21 and arranged between this shoulder and the tubular extension 20 is a washer 29 which serves to properly space the separate parts of the chuck. The adjacent end portions of the collar 10 and ring 16 are provided with projecting flanges 30 and 31 respectively and the adjacent faces of said parts are fashioned to form annular grooves for receiving a plurality of bearing balls 32 which are disposed between said faces as clearly seen in Figs. 1 and 4 of the drawing, thus permitting free and independent rotation of the separate parts 10 and 16 as well as to take up the thrust between said parts in the operation of the chuck.

In coupling the parts 10 and 16 together to form the unit 7, I employ a coupling ring 33 the side edges of which are spun or otherwise turned inwardly and radially as seen at 34 forming retaining flanges cooperating with the flanges 30 and 31. This construction forms of the unit what might be termed a ball bearing unit, the separate races of which constitute operative parts or elements, thus eliminating the necessity of employing independent ball races as in bearing constructions in common use.

It will also be apparent that my invention is not limited to the particular form of coupling ring herein shown and described, nor in fact to the use of a ring and any other means or method of coupling the parts 10 and 16 together may be employed. The outer wall of the casing 5 is preferably provided with a plurality of longitudinally arranged and circumferentially spaced ribs 35 which extend throughout the major length of the part 5 and these ribs serve to reinforce said casing and also provide means facilitating the rotation of the casing.

In the operation of the chuck device and when it is desired to mount a tool in connection therewith, the casing is rotated to feed the unit 7 upwardly, in which operation, the jaws 15 are moved upwardly in the bores 14 and radially with respect to the axis of the chuck. When the jaw faces 15ᵇ are separated sufficiently to engage the shank of the tool to be mounted in the chuck, the rotation of the casing is reversed to move the unit 7 downwardly and to feed the jaws 15 inwardly into firm engagement with the tool. The last named rotation of the chuck is the drive rotation or operation thereof which tends to increase the grip of the jaws upon the tool.

In releasing the tool, the casing 5 is given a sudden rotary movement in the first named direction, causing the clutch members of one part or unit to strike the clutch members of the other part or unit in a hammer blow fashion, facilitating the release of the tool, the clearance spaces 27 being employed for this purpose.

It will be noted upon a consideration of Fig. 1 of the drawing that the collar 10 slides longitudinally of the adaptor 22 in its vertical movement in the casing of the chuck and is keyed against rotation on the adapter 22 by the interengagement of the members 10ª and 22ª except in so far as the clearance spaces 27 are concerned.

It will also be apparent that while I have shown the collar 10 of the unit 7 as having a screw threaded engagement with the casing 5 that other equivalent means of engagement may be employed without departing from the spirit of my invention. In this connection, it is also to be understood that the particular manner of coupling the jaws with the ring of the unit 7 may also be modified, the distinctive feature of my invention residing in the provision of a jaw supporting and mounting unit in the form of a ball bearing unit which may be manufactured and sold entirely apart from the chuck device as a whole, permitting the replacement of this unit or any other parts of the chuck device aside from said unit should repair or replacement be found necessary. It is further understood that new jaws may be substituted for old or worn out jaws without replacing the entire unit in that the unit consists primarily of the two annular bodies and the means for coupling the same together.

As hereinbefore stated, while I have shown my improved unit as supported in connection with one form of chuck device, it will be understood that my invention is not limited in this respect and various other changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A jaw supporting and operating unit for a chuck device of the class described comprising a jaw supporting ring, a collar coupled with said ring and rotatable independently thereof, said collar having external screw threads adapted to operatively engage the body of said device to feed said unit with respect thereto, and the coupling of said ring and collar comprising an annular body having means at the side edges thereof engaging said ring and collar at their adjacent ends to prevent the separation thereof.

2. A jaw supporting and operating unit for a chuck device, said device involving a casing and a spindle part rotatably mounted in one end of the casing, said unit comprising a collar having external screw threads adapted to operatably engage said casing to feed said unit longitudinally with respect thereto, a jaw supporting ring coupled with said collar and rotatable independently thereof and bearing balls disposed between adjacent faces of said ring and collar, an annular body for coupling said ring and collar together with said balls disposed therebetween, and the engagement of said body with said ring and collar preventing relative separation of said parts and the bore of said collar having inwardly and radially projecting members forming clutch elements adapted to engage corresponding elements on said spindle part.

In testimony that I claim the foregoing as my invention I have signed my name this 28th day of September 1928.

GEORGE W. EMRICK.